Feb. 23, 1971 L. HANEWINKEL 3,566,378

BAR-CORE STORAGE

Filed Dec. 30, 1968

INVENTOR:

LORENZ HANEWINKEL

BY Breitenfeld & Levine

ATTORNEYS

United States Patent Office 3,566,378

Patented Feb. 23, 1971

3,566,378

BAR-CORE STORAGE

Lorenz Hanewinkel, Paderborn, Germany, assignor to Nixdorf Computer Aktiengesellschaft, a corporation of Germany Filed Dec. 30, 1968, Ser. No. 787,747
Claims priority, application Germany, Feb. 2, 1968, P 15 74 520.7
Int. Cl. G11c *11/04;* H01f *7/06;* H02b *1/04*
U.S. Cl. 340—174 3 Claims

ABSTRACT OF THE DISCLOSURE

Bar-core storage comprises plurality of stacked, panel-like wiring chambers, and at least one panel-like read-winding chamber. Each chamber has openings in alignment with corresponding openings in other chambers, and bar-core sections are accommodated within the openings. Information wires surround the openings of the wiring chambers, and read windings surround the openings of the read-winding chamber. Plugs project from narrow edge of each chamber, and extend in plane of chamber. No part of any chamber extends beyond the top and bottom walls of that chamber.

The present invention relates to a bar-core storage having a matrix arrangement in which the information wires are arranged in panel-like wiring chambers provided with openings for accommodating the bar cores.

Bar-core storages are normally made in the form of inductive storages, and particularly read-only storages. The information wires are threaded in the required manner around the openings for the bar cores so that binary information can be stored. A wiring chamber contains a plurality of information wires, up to 1000 and more, which are controlled via a decoder circuit, e.g., a Christmas-tree circuit. A complete bar-core storage comprises the bar cores with read windings and a plurality of wiring chambers. The bar cores extend perpendicular to the planes containing the wiring chambers and each bar core extends through all the wiring chambers. This results in difficulties when using the plug-in technique, since the wiring chambers are plugged into receptacle boards by pushing them in the direction of the planes which contain them, while the bar cores are inserted perpendicular to these planes.

The object of the present invention is to adapt a bar-core storage of the aforementioned type for the plug-in technique.

This result is achieved, in accordance with the invention, by dividing each bar core into sections corresponding to the thickness of a wiring chamber, and holding each section in an opening of its respective wiring chamber.

As a further feature of the invention, each wiring chamber has a lateral plugboard, the pins of which extend in the plane of the chamber.

Finally the invention proposes a read-winding chamber for receiving corresponding sections of the bar cores.

By means of a bar-core storage arranged in accordance with the invention, elements which extend perpendicular to the planes of the wiring chambers are eliminated. Each wiring chamber is a panel-like unit into which the bar-core sections are firmly inserted. No structural parts extend beyond the bottom and top walls of each wiring chamber. Accordingly, the individual wiring chambers can be inserted, in the direction of the planes of the chambers, into a socket. The different bar-core sections of the wiring chambers are aligned precisely with each other after the insertion of the chambers. Since the return path of the magnetic lines of forces is long, small air gaps between the bar-core sections of adjacent wiring chambers do not result in substantial losses. Each gap may be as large as one-fourth the diameter of its respective cores. This causes no difficulties from the standpoint of manufacture. The subsequent inserttion of bar cores perpendicular to the plane of the wiring chambers, which represents tedious and cumbersome work, is done away with. Furthermore, wiring chambers, or storage inserts, of different types for the storage of tables can be kept on hand, which can be introduced as desired into the plug-in stack formed of a number of wiring chambers.

The invention will now be explained on basis of preferred embodiments with reference to the accompanying drawings, in which.

Figures 1, 2, 3:
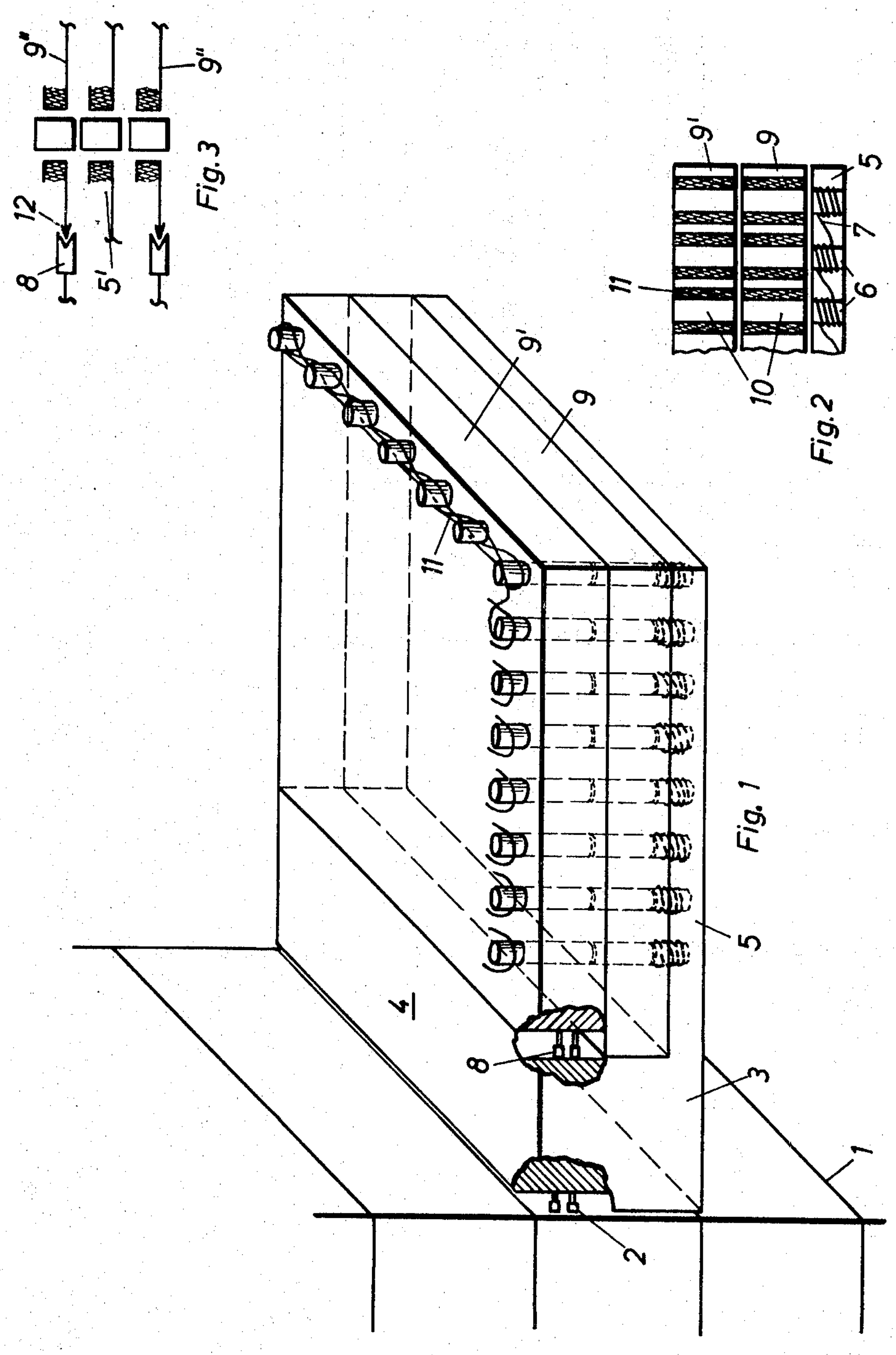
FIG. 1 is a schematic perspective view of a bar-core storage arrangement in accordance with the invention.
FIG. 2 is a fragmentary section through the arrangement of FIG. 1.
FIG. 3 is a schematic showing of another embodiment of the invention.

FIG. 1 shows a frame or chassis 1 which contains a working storage, a computer, or some other data processing equipment. The frame 1 is provided at suitable attachment surfaces with socket units 2, which are merely schematically indicated, and are formed in detail as multiple sockets, plugboards, or the like. Into each of these socket units is inserted a bar-core plug-in stack 3 which contains, in the space 4, the required electronic controls (not shown in detail). Bar-core sections 6 are accommodated within openings in a read-winding chamber 5, a read-winding 7 being wound around each bar-core section. The length of the bar-core sections 6 is equal to the thickness of the read-winding chamber 5. The plug-in stack 3 is provided with socket units 8 in the form of plugboards or the like. Into these socket units 8 are plugged wiring chambers 9, 9′ each formed with openings to receive bar-core sections 10, the length of each section 10 being equal to the thickness of its respective wiring chamber. Around the bar-core sections 10 are threadeed in known manner the information wires 11 corresponding to the specific information to be stored. Each information chamber 9, 9′ furthermore contains a decoding circuit (not shown) for selecting the information wire desired in each case, as is known per se.

Each wiring chamber 9, 9′ and the read-winding chamber 5 is a panel-like unit from which no structural parts protrude beyond the plane of the panel. The bar-core sections terminate substantially flush with the chamber surfaces. Between bar-core sections held in adjacent panels and in alignment with each other, there remains in the inserted condition of the chambers only a small gap which is small as compared with the bar-core diameter. On one narrow side, each wiring chamber has plugs or the like for connection with the socket units 8. The read-winding chamber 5 can be correspondingly formed, or alternatively the read-winding chamber 5 can be firmly connected to or made integral with the plug-in stack 3 as shown in FIG. 1. The wiring chambers 9 and 9′, with their information wires, can be freely replaced at any time and can be replaced by other wiring chambers having different information content.

FIG. 3 shows a modified embodiment of the invention in which a read-winding chamber 5′ is arrangeed in the center. Above and below the chamber 5′, the latter is joined by wiring chamber 9″ which are connected via plug connections 12 to socket units 8 on the stack side.

The sequence of read-winding and wiring chambers can thus be selected as desired. Similarly two or a larger number of wiring chamber can be associated with one read-winding chamber.

The invention simplifies the mass production of bar-core storages, since the wiring chambers and read-winding chambers can be manufactured and wired firmly in position in accordance with a fixed plan. The assembling and replacement of individual chambers to form a complete bar-core storage is very simple, since in each case only one plug-in unit need be replaced.

The embodiments of the invention in which an exclusive property or privilege is claimed are defined as follows:

1. A bar-core storage comprising a plurality of stacked, panel-like wiring chambers, a read-winding chamber, each of said chambers having a plurality of openings extending substantially perpendicular to the plane containing the chamber, the openings in each of said chambers being aligned with openings in the other chambers when the bar-core storage is in use, information wires surrounding the openings in said wiring chambers, read-windings surrounding the openings in said read-winding chamber, and separate bar-core sections accommodate within the openings in said wiring and read-winding chambers, the maximum length of each bar-core section being equal to the thickness of its respective chamber.

2. A bar-core storage as defined in claim 1 including a plug projecting from an edge of each wiring chamber, each plug extending in the plane of its respective wiring chamber.

3. A bar-core storage comprising a plurality of stacked, panel-like wiring chambers, each wiring chamber having a plurality of openings extending substantially perpendicular to the plane containing the chamber, information wires surrounding said openings and so wound that binary information can be stored, separate bar-core sections accommodated within the openings of each wiring chamber, the maximum length of each bar-core section being equal to the thickness of its respective wiring chamber, a read-winding chamber, and read windings carried by said read-winding chamber for sensing the magnetic flux engendered by said information wires.

References Cited

UNITED STATES PATENTS 2,934,748 4/1960 Steiman ------------ 340—174
3,440,719 4/1969 Meier.

JAMES W. MOFFITT, Primary Examiner

U.S. Cl. X.R.

29—604; 317—101